(12) United States Patent
Merchant et al.

(10) Patent No.: US 11,234,050 B2
(45) Date of Patent: Jan. 25, 2022

(54) USE OF STEGANOGRAPHICALLY-ENCODED DATA AS BASIS TO CONTROL DYNAMIC CONTENT MODIFICATION AS TO AT LEAST ONE MODIFIABLE-CONTENT SEGMENT IDENTIFIED BASED ON FINGERPRINT ANALYSIS

(71) Applicant: Roku, Inc., San Jose, CA (US)

(72) Inventors: Shashank Merchant, Sunnyvale, CA (US); Do Phuoc Hoang Tuong Lan, Seoul (KR)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 15/929,225

(22) Filed: Feb. 14, 2020

(65) Prior Publication Data

US 2020/0404371 A1 Dec. 24, 2020

Related U.S. Application Data (60) Provisional application No. 62/863,007, filed on Jun. 18, 2019.

(51) Int. Cl.
*H04N 21/4402* (2011.01)
*H04N 21/4627* (2011.01)
(Continued)

(52) U.S. Cl.
CPC ... *H04N 21/440245* (2013.01); *G06F 16/783* (2019.01); *H04N 21/4627* (2013.01); *H04N 21/4852* (2013.01); *H04N 21/4854* (2013.01)

(58) Field of Classification Search
CPC ....... H04N 21/440245; H04N 21/4627; H04N 21/4852; H04N 21/4854; G06F 16/783
See application file for complete search history.

(56) References Cited

U.S. PATENT DOCUMENTS 7,289,643 B2 * 10/2007 Brunk ................ G06K 9/00744
382/100
7,519,819 B2 * 4/2009 Bradley ................ G06T 1/0028
340/5.86
(Continued)

FOREIGN PATENT DOCUMENTS

| AT | 508967 A1 * | 5/2011 | ............. G01S 7/487 |
| CN | 100521781 C * | 7/2009 | ............. G11B 27/34 |
| WO | WO-2013008255 A2 * | 1/2013 | ......... H04N 21/4622 |

OTHER PUBLICATIONS

International Search Report and Written Opinion from International Application No. PCT/US2020/037884, dated Oct. 6, 2020.

*Primary Examiner* — James R Sheleheda
(74) *Attorney, Agent, or Firm* — McDonnell Boehnen Hulbert & Berghoff LLP (57) ABSTRACT

The disclosure provides for use of steganographically-encoded data as a basis to control content modification. A server could determine through a fingerprint comparison that a portion of media content on a channel being rendered by a content presentation device matches at least one modifiable-content segment, such as at least one replaceable ad. The server could then use watermark data encoded in the media content of the channel as a basis to determine an actual identity of a modifiable-content segment present on the channel, so as to then control content modification.

12 Claims, 6 Drawing Sheets

(51) Int. Cl.
*G06F 16/783* (2019.01)
*H04N 21/485* (2011.01)

(56) References Cited

U.S. PATENT DOCUMENTS

| | | | | |
|---|---|---|---|---|
| 8,041,058 B2* | 10/2011 | Kentish | G10L 19/018 | 381/119 |
| 8,300,884 B2* | 10/2012 | Sharma | G06T 1/0028 | 382/100 |
| 8,625,839 B2* | 1/2014 | Grill | H04N 21/8358 | 382/100 |
| 9,037,453 B2* | 5/2015 | Grill | H04N 1/32154 | 704/201 |
| 9,055,309 B2* | 6/2015 | Neumeier | H04N 21/44008 | |
| 9,992,533 B2* | 6/2018 | Lee | H04H 60/31 | |
| 10,104,426 B2 | 10/2018 | Seo et al. | | |
| 10,805,626 B2* | 10/2020 | Deshpande | H04N 21/8358 | |
| 2001/0044899 A1* | 11/2001 | Levy | G07F 7/1008 | 713/176 |
| 2002/0021824 A1* | 2/2002 | Reed | G10L 19/018 | 382/100 |
| 2002/0059644 A1* | 5/2002 | Andrade | H04N 21/8586 | 725/136 |
| 2002/0104090 A1* | 8/2002 | Stettner | H04N 21/4223 | 725/60 |
| 2003/0192060 A1* | 10/2003 | Levy | H04N 21/47217 | 725/133 |
| 2006/0168448 A1* | 7/2006 | Van Der Veen | H04N 1/32203 | 713/176 |
| 2007/0186269 A1* | 8/2007 | Malik | H04N 21/4316 | 725/135 |
| 2009/0077580 A1 | 3/2009 | Konig et al. | | |
| 2010/0174608 A1* | 7/2010 | Harkness | H04L 63/12 | 705/14.53 |
| 2010/0269128 A1* | 10/2010 | Gordon | H04N 21/44008 | 725/25 |
| 2011/0246202 A1* | 10/2011 | McMillan | G10L 19/018 | 704/270 |
| 2013/0031582 A1* | 1/2013 | Tinsman | H04N 21/4316 | 725/36 |
| 2013/0308818 A1* | 11/2013 | MacIntosh | H04N 21/44008 | 382/100 |
| 2014/0075470 A1* | 3/2014 | Oh | H04N 21/23892 | 725/32 |
| 2014/0150022 A1* | 5/2014 | Oh | H04N 21/478 | 725/37 |
| 2014/0196071 A1* | 7/2014 | Terpstra | H04N 21/812 | 725/19 |
| 2014/0245339 A1* | 8/2014 | Zhang | H04N 21/4398 | 725/18 |
| 2014/0250479 A1* | 9/2014 | Lee | H04N 21/8358 | 725/110 |
| 2015/0341410 A1* | 11/2015 | Schrempp | H04L 65/605 | 709/231 |
| 2016/0055607 A1* | 2/2016 | Petrovic | G06T 1/0028 | 382/100 |
| 2016/0182973 A1* | 6/2016 | Winograd | H04N 21/4722 | 725/25 |
| 2017/0013324 A1 | 1/2017 | Chen | | |
| 2017/0070790 A1* | 3/2017 | Misra | H04N 21/439 | |
| 2017/0164071 A1* | 6/2017 | An | H04N 21/2365 | |
| 2017/0251280 A1* | 8/2017 | Seo | H04N 21/6543 | |
| 2017/0280176 A1 | 9/2017 | Gordon | | |
| 2017/0371963 A1 | 12/2017 | Bilobrov | | |
| 2018/0220200 A1* | 8/2018 | Winograd | H04N 21/8358 | |
| 2018/0367868 A1* | 12/2018 | Banger | H04N 21/8358 | |
| 2018/0376156 A1* | 12/2018 | Deshpande | H04N 21/8358 | |
| 2019/0182541 A1 | 6/2019 | Seo et al. | | |
| 2019/0306577 A1* | 10/2019 | Jeong | H04N 21/44213 | |
| 2020/0128295 A1* | 4/2020 | Seo | H04N 21/8456 | |
| 2020/0304821 A1* | 9/2020 | Davis | H04N 21/8455 | |

* cited by examiner

USE OF STEGANOGRAPHICALLY-ENCODED DATA AS BASIS TO CONTROL DYNAMIC CONTENT MODIFICATION AS TO AT LEAST ONE MODIFIABLE-CONTENT SEGMENT IDENTIFIED BASED ON FINGERPRINT ANALYSIS

REFERENCE TO RELATED APPLICATION

This application claims priority to U.S. Provisional Patent Application No. 62/863,007, filed Jun. 18, 2019, the entirety of which is hereby incorporated by reference.

BACKGROUND

A typical content presentation device operates to receive an analog or digital media stream representing media content such as video and/or audio content and to render and present the media content on a user interface such as a display screen and/or an audio speaker. Examples of such devices include, without limitation, televisions, computer monitors, projection systems, loudspeakers, headphones, and the like.

In many cases, such a content presentation device may be in communication with a receiver, such as a local set top box or other similar device or a remote server, that has access to numerous discrete channels of media content and that can selectively deliver a given such channel's media content to the content presentation device for playout.

By way of example, a television may be communicatively linked by a High-Definition Multimedia Interface (HDMI) cable or other interface with a cable-TV set top box that has access to a set of cable-TV channels, and the set top box may be configured to receive user input selecting a particular channel and to responsively tune to the selected channel and output to the television the media content of the selected channel, for presentation of the media content to a user. As another example, a loudspeaker may be communicatively linked with a radio that has access to a set of radio stations, and the radio may be configured to receive user input selecting a particular channel (station) and to responsively tune to the selected channel and output to the loudspeaker the media content of the selected channel, for presentation of the media content to a user. And as still another example, a content presentation device such as a display or speaker may be communicatively linked with a computer that has access to a myriad of online streaming media channels, and the computer may be configured to receive user input selecting a particular channel and to responsively initiate receipt and output of the selected media content and provide the media content to the display and/or speaker for presentation to a user.

SUMMARY

When a content presentation device receives and renders media content, the content presentation device may not have an indication of which channel of media content the content presentation device is rendering. A receiver or other device that selectively tunes to the channel and receives the media content and that provides the media content to the content presentation device may have such information, but the content presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

For various reasons, however, it may be useful to determine which of various channels is the channel that carries the content being rendered by a content presentation device. Further, it may be useful to do so without receiving from a channel-selection device (e.g., receiver or remote control) a report of the channel to which that device is tuned, and perhaps without any involvement of the channel-selection device. For instance, it may be useful for the content presentation device itself, and/or a network server working in cooperation with the content presentation device, to determine the channel based on an evaluation of the media content that is being rendered by the content presentation device.

Given knowledge of the channel that the content presentation device is rendering, the network server and/or another entity could then carry out one or more operations keyed to the channel, such as determining and recording an extent to which media content of that channel is being played, selectively replacing a predetermined portion of the media content with alternative content (such as dynamically inserting a replacement advertisement), or superimposing channel-specific content over the media content for presentation along with the media content, among numerous other possibilities.

One method to determine the channel that the content presentation device is rendering is to apply fingerprint-based automatic content recognition (ACR). With fingerprint-based ACR, an entity could be provisioned with reference data that includes digital reference fingerprints respectively representing each of various known channels of media content (e.g., each of the channels within a subscription plan for a set-top box that supplies media content to the content presentation device) and that maps the reference fingerprints to the respective channels that they represent. Further, the entity could be provided with digital query fingerprints that represent the media content currently being rendered by the content presentation device, and the entity could compare the query fingerprints with the reference fingerprints in an effort to find a match. Upon finding that the query fingerprints match the reference fingerprints mapped to a particular channel, the entity could thus determine that the channel being rendered by the content presentation device is that particular channel.

In an example implementation of fingerprint-based ACR, a content distribution system that is configured to distribute various known channels of media content to content presentation devices could regularly provision a fingerprint-matching server with reference data to enable the fingerprint-matching server to conduct the fingerprint analysis. In particular, for each of various channels, the content distribution system could generate timestamped reference fingerprints on a per-frame basis or other ongoing basis and could regularly transmit the reference fingerprints to the fingerprint-matching server along with information mapping each reference fingerprint to the channel that it represents.

Further, as the content presentation device receives and renders a given channel of media content, the content presentation device could generate the timestamped query fingerprints of the media content on a pre-frame basis or other ongoing basis and could regularly transmit the generated query fingerprints to the fingerprint-matching server for analysis.

On an ongoing basis or in response to one or more trigger events, the fingerprint-matching server could thus compare the query fingerprints provided by the content presentation device with the reference fingerprints provided by the content distribution system. And upon finding with sufficient certainty that the query fingerprints match reference fingerprints that the reference data maps to a particular channel, the fingerprint-matching server could reasonably conclude that that is the channel being rendered by the content presentation device.

In a representative implementation, determining the channel that the content presentation device is rendering could help facilitate dynamic content modification, such as targeted advertisement replacement.

By way of example, once the fingerprint-matching server has determined the channel that the content presentation device is rendering, the fingerprint-matching server or another entity could then use that determined channel identity as a basis to detect when a content-modification opportunity is about to occur on that channel. And the fingerprint-matching server or other entity could then responsively cause the content presentation device to carry out a content modification at the time of the content-modification opportunity.

This example channel-specific action could take advantage of a time delay that is likely to exist from the point in time when the content distribution system outputs media content of the channel for transmission to the content presentation device to the point in time when the content presentation device renders that media content. Depending on the configuration of the system, this delay could be on the order of 5-10 seconds.

Given that delay, it could be possible for the content distribution system, the fingerprint-matching server, and/or one or more other entities to detect the presence of particular content defining a content-modification opportunity on the channel of media content that is en route to the content presentation device well enough before that content arrives at the content presentation device. By engaging in relatively quick out-of-band (e.g., Internet Protocol (IP) based) communication with the content presentation device during that delay period, a server could then prepare the content presentation device to engage in content modification with respect to the detected content, so that when the detected content ultimately arrives at the content presentation device, the content presentation device could carry out the content modification in a timely manner.

As to content modification, for instance, the fingerprint-matching server could be provisioned in advance with modifiable-content segment data that includes digital fingerprints respectively representing each of various modifiable-content segments of media content, along with associated metadata per modifiable-content segment, such as a duration of the segment, an identifier of the segment, a type of associated content modification (e.g., replacement or overlay) and the like. For instance, a content management system could generate and provide this information in advance to the fingerprint-matching server.

Having identified the channel being rendered by the content presentation device, the fingerprint-matching server could then compare the ongoing reference fingerprints representing that identified channel with the fingerprints representing the various modifiable-content segments. And upon finding with sufficient certainty that the reference fingerprints of the identified channel match the fingerprints representing a particular modifiable-content segment, the fingerprint-matching server could reasonably conclude that the media content en route to the content presentation device includes that modifiable-content segment. Further, the fingerprint-matching server could thereby determine from the reference data of the identified channel the frame-timestamp or other timing information indicating when the modifiable-content segment is present on the channel.

Upon so detecting the presence of a modifiable-content segment in the media content of the channel en route to the content presentation device, the fingerprint-matching server and/or another entity could then responsively engage in out-of-band signaling with the content presentation device to enable and cause the content presentation device to perform a content modification with respect to that modifiable-content segment.

For instance, the fingerprint-matching server could provide the content presentation device with timing information regarding the upcoming content-modification opportunity. The timing information regarding the upcoming content-modification opportunity could include frame-timestamp information or other timing information that informs the content presentation device when the modifiable-content segment will be present on the channel of media content that the content presentation device is receiving and rendering. For example, this could include a frame-timestamp of the start of the modifiable-content segment on the channel and a duration of the modifiable-content segment and/or frame-timestamp of the end of the modifiable-content segment on the channel. With this timing information, the content presentation device could accordingly plan to carry out a content modification at the time of the modifiable-content segment.

Further, the fingerprint-matching server could provide the content presentation device with various other information regarding the modifiable-content segment, to enable the content presentation device to carry out the content modification at the indicated time of the modifiable-content segment. For instance, the fingerprint-matching server could provide the content presentation device with metadata as described above, such as a duration of the segment, an identifier of the segment, and a type of associated content modification (e.g., replacement or overlay) and the like.

With this information, the content presentation device could then responsively work with the content management system and/or another entity to obtain details of the content modification to perform with respect to the upcoming modifiable-content segment. For instance, the content presentation device could transmit to the content management system a request that provides the content management system with the modifiable-content segment identifier and other associated metadata about the modifiable-content segment. And the content management system could responsively provide the content presentation device with information to facilitate the content modification.

The content management system could use various information as a basis to determine supplemental content that the content presentation device should render in place of or as an overlay superimposed on the modifiable-content segment. For instance, the content management system could use user-demographics, location, or other information regarding the content presentation device as a basis to determine appropriate supplemental content.

Further, the content management system could ascertain a storage location of determined supplemental content and could provide the content presentation device with an indication of that storage location. For instance, the content management system could query a supplemental-content delivery system to determine a uniform resource locator (URL) or other address from which the content presentation device could obtain the supplemental content from a network server or from local data storage of the content presentation device. And the content management system could provide the content presentation device with that address and/or with other information to enable the content presentation device to obtain the supplemental content, or the content management system could itself provide the content presentation device with the supplemental content.

With this information, the content presentation device could thus obtain the supplemental content and could plan to present the supplemental content (e.g., as replacement or overlay) at the time of the modifiable-content segment on the channel that the content presentation device is rendering.

In addition, the fingerprint-matching server could work with the content presentation device to help confirm that the channel to which the content presentation device is tuned remains the identified channel, as a condition for the content presentation device carrying out, and/or continuing to carry out, the content modification.

For instance, the fingerprint-matching server could also transmit to the content presentation device a set of the reference fingerprints representing certain media content of the identified channel, such as the reference fingerprints representing frames of the identified channel for a period of time leading up to the time when the modifiable-content segment is present on the channel and continuing through the duration of the modifiable-content segment on the channel.

The content presentation device could then compare those reference fingerprints with the query fingerprints that the content presentation device generates representing the channel currently being rendered by the content presentation device, to confirm that the content presentation device is still rendering the identified channel up until the time the content modification is to start. And if the content presentation device finds with sufficient certainty that the query fingerprints continue to match those reference fingerprints up until the time when the content modification is to start, then the content presentation device could proceed with the content modification at the planned time. Whereas, if the content presentation device finds a sufficient mismatch between the query fingerprints and the reference fingerprints before the time when the content modification is to occur, the content presentation device could responsively abandon the planned content modification, on grounds that the content presentation device is likely now rendering a different channel.

Further, while the content presentation device is presenting the modified content, the content presentation device could continue to compare the provided reference fingerprints with the query fingerprints that the content presentation device generates of the underlying identified channel (e.g., of the underlying channel of media content that the content presentation device is receiving), to determine whether the content presentation device should continue with the content modification. If the content presentation thus finds with sufficient certainty that the query fingerprints continue to match the reference fingerprints, then the content presentation device could continue with the content modification. Whereas, if the content presentation device finds a sufficient mismatch between the query fingerprints and the reference fingerprints during the course of the modifiable-content segment in the underlying channel content, then the content presentation device could responsively discontinue and thus abandon the content modification, so as to avoid continuing to apply the content modification to the likely different channel that the content presentation device is now rendering.

The content-modification process described so far could be carried out for various purposes. Without limitation, for instance, the content-modification process could be carried out to facilitate dynamic advertisement insertion (DAI), in which the content presentation device replaces a generally applicable ad (e.g., a nationally broadcast ad) with a replacement ad possibly selected based on location, user demographics, or other information specific to the content presentation device.

For DAI, an entity such as content broadcaster, distributor, or ad-replacement service might enter into agreements with an advertisers to facilitate replacing playout of certain ads, deemed "replaceable ads," with different ads, deemed "replacement ads." For each of various replaceable ads, the content management server or other entity could then receive a copy of the replaceable ad and could provision the fingerprint-matching server with digital fingerprints representing the replaceable ad and with associated data regarding the replaceable ad. For instance, for each replaceable ad, the content management server could generate digital fingerprints of the replaceable ad on a per-frame basis or the like and could transmit to the fingerprint-matching server the generated fingerprints of the replaceable ad along with metadata as described above, such as a unique identifier of the replaceable ad, a duration of the replaceable ad, an indication that the ad is to be replaced, and so forth. (Further, the data provided to the fingerprint-matching server could include a traffic schedule that indicates when specific ads, with particular identifiers and associated fingerprints, are scheduled to be presented on each of one or more channels.)

Once the fingerprint-matching server has identified the channel being rendered by the content presentation device, the fingerprint-matching server could then responsively compare the reference fingerprints representing that identified channel with the fingerprints representing various replaceable ads. And upon finding with sufficient certainty that the reference fingerprints of the identified channel match the fingerprints representing a particular replaceable ad, the fingerprint-matching server could reasonably conclude that the channel being rendered by the content presentation device includes the replaceable ad, and more specifically that the media content en route to the content presentation device includes that replaceable ad.

In response to this conclusion, the fingerprint-matching server and/or another entity could engage in signaling with the content presentation device to prepare the content presentation device to present a replacement ad in place of the replaceable ad. In line with the discussion above, for instance, the fingerprint-matching server or other entity could transmit to the content presentation device, through out-of-band signaling, one or more messages that provide the content presentation device with (i) a frame-timestamp or other information that indicates when the replaceable ad will occur on the channel that the content presentation device is rendering, (ii) the unique identifier and duration of the replaceable ad, and (iii) reference fingerprints of representing frames of the channel at least up to and through the time of that the replaceable ad will occur.

Given the identifier and duration of the replaceable ad, the content presentation device could then engage in out-of-band signaling with the content management system to ascertain a replaceable ad that the content presentation device should render in place of the replaceable ad. Here, the content presentation device might provide the content management system with a user identification, demographics, location, and/or other information that the content management system could use as a basis to select an appropriate replacement ad. Further, the content management system could use the duration of the replaceable ad, indicated by the content presentation device or mapped to the ad-identifier of the replaceable ad for instance, to select a replacement ad that is of the same duration as the replaceable ad.

The content management system could then work with the supplemental-content delivery system to determine a URL or other address or location from which the content presentation device could obtain the replacement ad and could inform the content presentation device accordingly. And the content presentation device could thus obtain the replacement ad and plan to render the replacement ad in place of the replaceable ad on the channel that the content presentation device is rendering, as discussed above.

Further, the content presentation device could make use of the provided reference fingerprints to handle a channel change that may occur before the replaceable ad is present on the channel or during the course of the replaceable ad on the channel. As noted above, for instance, the content presentation device could continue to generate query fingerprints of the underlying channel that the content presentation device is receiving and to compare those query fingerprints with the provided reference fingerprints. And if the content presentation device thereby detects a sufficient mismatch between the query fingerprints and the reference fingerprints, the content presentation device could abandon playout of the replacement ad to avoid playing out the replacement ad on a different channel.

Unfortunately, a technical problem that can arise in the above process is that there could be multiple modifiable-content segments that begin with the same media content as each other but that are otherwise different than each other. For instance, as to DAI, there could be multiple different durations of the same ad, all of which begin with the same media content as each other. For example, an advertiser might produce 15-second and 30-second versions of a given ad, beginning with the same media content as each other but otherwise being different ads than each other, with one being twice as long as the other. Other scenarios, not limited to differences in duration, could also exist where two ads or two other types of modifiable-content segments are the same as each other at their starts but are not identical to each other.

At least two different problems can arise in this situation.

One problem is that, as the fingerprint-matching server is comparing reference fingerprints of the identified channel with fingerprints of various modifiable-content segments in an effort to detect the presence of a particular modifiable-content segment on the channel, the fingerprint matching server may find a match with the wrong modifiable-content segment.

For example, if the channel includes a replaceable 30-second version of an ad having an initial portion that is the same as a 15-second version of the ad, the fingerprint-matching server might find, based on that starting portion, that the reference fingerprints of the channel match the fingerprints of the 15-second version of the ad. As a result, the fingerprint-matching server may engage in signaling to prepare the content presentation device to replace what seems to be the 15-second version of the ad. But the ad actually present on the channel is the 30-second version of the ad. Therefore, the DAI would not work properly.

Another problem is that, as the fingerprint-matching server is comparing reference fingerprints of the identified channel with fingerprints of various modifiable-content segments in an effort to detect the presence of a particular modifiable-content segment on the channel, the fingerprint matching server may find that the reference fingerprints of the identified channel match fingerprints of multiple different modifiable-content segments, and so the server's identification of the modifiable-content segment on the channel would be inconclusive.

For instance, again if the channel includes a replaceable 30-second version of an ad that has an initial portion that is the same as a 15-second version of the ad, the fingerprint-matching server might find, based on that starting portion, that the reference fingerprints match both the fingerprints of the 15-second version of the ad and the 30-second version of the ad. Therefore, the fingerprint-matching server would not have conclusively identified the ad present on the channel, and so the fingerprint-matching server would not be able to trigger the DAI process.

Disclosed herein is a method and system to help validate or resolve identification of a modifiable-content segment where such ambiguity exists in fingerprint-based identification of the modifiable-content segment. In particular, the disclosed method and system provide for resolving the ambiguity by making use of watermark data encoded on the identified channel that is being rendered by the content presentation device (or likewise making use of data otherwise steganographically encoded in the identified channel).

In accordance with the disclosure, once the fingerprint-matching server has conducted a fingerprint comparison and has thereby found that the reference fingerprints of the identified channel match the fingerprints of at least one modifiable-content segment, the fingerprint-matching server will then engage in a process to determine, from watermark data encoded on the channel, the actual identity of the modifiable-content segment that is present on the channel. And the fingerprint-matching server will then use that determined actual identity of the modifiable-content segment as a basis to control the content-modification process.

As to DAI, for instance, once the fingerprint-matching server has conducted a fingerprint comparison and has thereby found that the reference fingerprints of the identified channel match the fingerprint(s) of at least one replaceable ad, the fingerprint-matching server will then engage in a process to determine from watermark data encoded on the channel the actual identity of the replaceable ad that is present on the channel. And the fingerprint-matching server will then use that determined actual ad-identity as a basis to control the content modification process.

If the fingerprint-matching server does not have access to the media of the channel that is en route to the content presentation device, the fingerprint-matching server could query an entity that has access to that media content, as a basis to determine from watermark data encoded on the channel the actual identity of the modifiable-content segment present on the channel. For instance, the fingerprint-matching server might query the content distribution system, to cause the content distribution system to decode the watermark data to determine the actual identity of the modifiable-content segment present on the channel, and to report in response to the fingerprint-matching server the determined actual identity.

In an example implementation, if the fingerprint-matching server has identified though the fingerprint comparison process a modifiable-content segment present on the channel, then the fingerprint-matching server could responsively carry out at least two operations: (1) the fingerprint-matching server could signal to the content presentation device as noted above to prepare and enable the content presentation device to carry out a content modification with respect to the identified modifiable-content segment, and (2) the fingerprint-matching server could determine based on watermark data encoded on the channel whether the fingerprint-matching server identified the correct modifiable-content segment on the channel.

Determining based on the watermark data encoded on the channel whether the fingerprint matching server identified the correct modifiable-content segment on the channel could involve (a) the fingerprint-matching server or another entity decoding a watermark from the channel and reading from the decoded watermark the actual identity of the modifiable-content segment present on the channel and (b) comparing that actual identity of the modifiable-content segment present on the channel with the identity of the modifiable-content segment that the fingerprint-matching server identified on the channel.

If the fingerprint-matching server thereby confirms that the identity of the modifiable-content segment present on the channel is the same as the identity of the modifiable-content segment that the fingerprint-matching server identified on the channel, then the fingerprint-matching server could allow the content presentation device to proceed with preparing for and carrying out the content modification with respect to the identified modifiable-content segment. Whereas, if the fingerprint-matching server thereby determines that the identity of the modifiable-content segment present on the channel is different than the identity of the modifiable-content segment that the fingerprint-matching server identified on the channel, then the fingerprint-matching server could signal to the content presentation device to cause the content presentation device to abandon the content modification, so as to prevent the content presentation device from proceeding with the content modification, or, depending on timing, the fingerprint-matching server could forgo directing the content presentation device to implement the content modification.

In another example implementation, if the fingerprint-matching server has identified though the fingerprint comparison process two or more modifiable-content segments whose initial portions match the reference fingerprints of the channel, then the fingerprint-matching server could responsively (1) determine based on watermark data encoded on the channel what the actual identity of the modifiable-content segment on the channel is and (2) use that determined actual identity of the modifiable-content segment as a basis to disambiguate the multi-match, i.e., to determine which of the matching modifiable-content segments is the modifiable-content segment actually present on the channel. And upon so determining which matching modifiable-content segment is the modifiable-content segment actually present on the channel, the fingerprint-matching server could then signal to the content presentation device to prepare and enable the content presentation device to carry out content modification with respect to that identified modifiable-content segment.

This arrangement could make beneficial use of watermarking that may be provided in the media content of the channel for the present purpose and/or for one or more other purposes. In an example implementation, for instance, the media content of the channel at issue could be watermarked with modifiable-content-segment identification information to facilitate monitoring of playout of modifiable-content segments. For example, the media content of the channel could be watermarked with ad-identifiers present on the channel, to facilitate monitoring of playout of those ads. And the present arrangement could take advantage of that watermarking to facilitate control over the content modification process.

For example, a broadcaster or distributor of a channel of media content, or another entity associated with providing the channel, could encode in the media content of the channel, within or otherwise in connection with each ad present on the channel, a watermark that includes a unique identifier of the ad, so that metering devices in select panelist homes can decode the watermarks, read the ad-identifiers, and report the ad-identifiers to a data-management system facilitate tracking of ad playout. Here, however, such included ad-identifier watermarks could be used to facilitate control of the DAI process.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Referring to the drawings, as noted above, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

Figure 1:
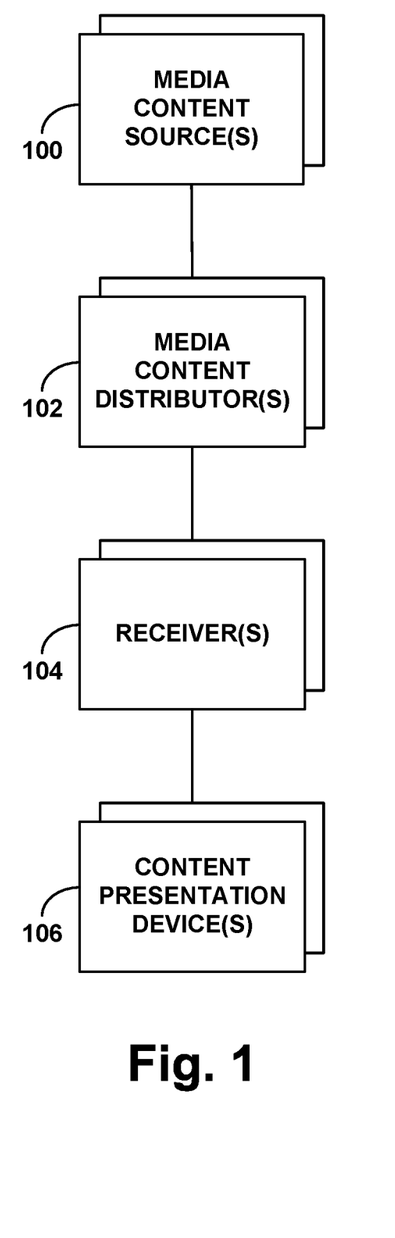
FIG. 1 is a simplified block diagram of an example system in which various disclosed principles can be applied.

As shown in FIG. 1, the example system includes one or more media content sources 100 (e.g., broadcasters, web servers, etc.), one or more media content distributors 102 (e.g., multi-channel distributors, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., televisions or other display devices, loudspeakers or other audio output devices, etc.)

In practice, for instance, the media content sources 100 could be national broadcasters, such as ABC, NBC, CBS, FOX, HBO, and CNN, the media content distributors 102 could be local affiliates and/or other local content distributors in designated market areas (DMAs), and the receivers 104 and content presentation devices 18 could then be situated at customer premises, such as homes or business establishments. With this or other arrangements, the content sources 100 could deliver media content to the content distributors 102 for distribution to receivers 104 at customer premises, and the content distributors could distribute the media content to the receivers 104 on discrete channels (e.g., particular frequencies or other defined channels). Each receiver could then respond to user input or one or more other triggers by tuning to a selected channel and outputting to a content presentation device 106 the media content that is arriving on the selected channel. And the content presentation device 106 could receive and render the media content (e.g., display or otherwise present the content).

In this or other arrangements, as noted above, as the content presentation device receives and renders this media content, the content presentation device may have no indication of the channel on which the media content is arriving, i.e., of the channel to which the receiver is tuned. Rather, the content presentation device may be configured simply to receive the media content as a media stream from the receiver and to render the received media content. Per the present disclosure, however, the content presentation device may be in communication with a network server and may work with the network server to facilitate identification of the channel and thus to facilitate taking useful channel-specific action.

Figure 2:
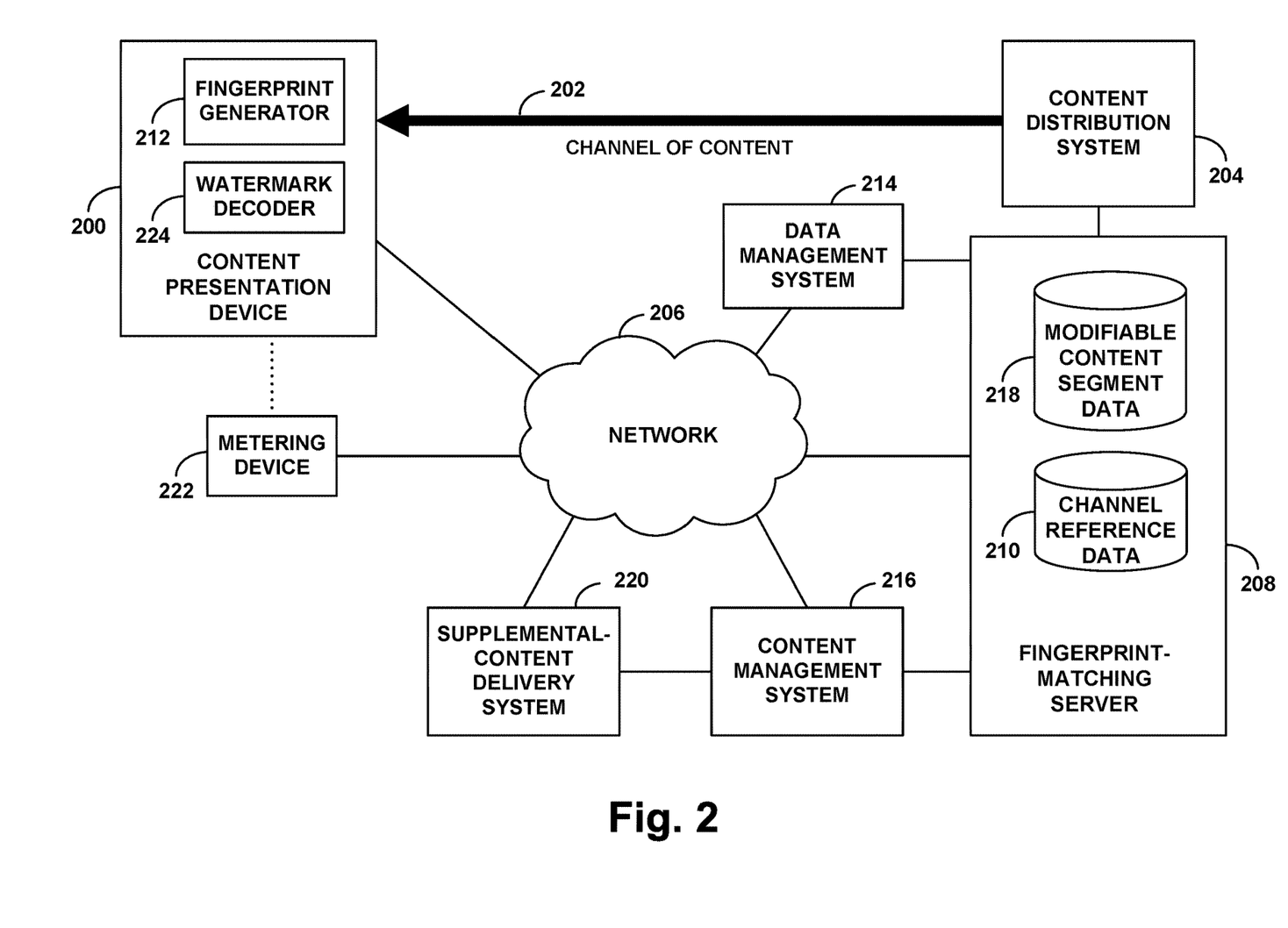
FIG. 2 is another simplified block diagram of an example system in which various disclosed principles can be applied.

FIG. 2 illustrates more specifically an example system in which the presently disclosed features could be implemented.

FIG. 2 shows at its top a representative content presentation device 200 receiving a channel of content 202 being provided by a content distribution system 204. By way of example, the content presentation device 200 could be an example content presentation device 100 as shown in FIG. 1, and the content distribution system 204 could comprise a representative media content source 100 and/or media content distributor 102 as shown in FIG. 1.

As such, the content presentation device 200 could be receiving and rendering the channel of content as a linear broadcast feed directly or indirectly from the content distributor system 204 through any of a variety of distribution channels, such as but not limited to cable, satellite, terrestrial over-the-air broadcast, broadband streaming, or others now known or later developed.

In an example implementation, the media content of the channel could define a sequence of digital frames of media content that the content presentation device is configured to render for presentation to a user. The content distributor system 204 might be broadcasting this sequence of frames encapsulated in a transport stream for receipt by a set top box, tuner, or other receiver that is tuned to the channel, and the receiver may be extracting the sequence of frames from the transport stream and outputting the sequence of frames for presentation by the content presentation device.

As further shown in FIG. 2, the content presentation device 200 is interconnected with a communication network 206, such as the Internet. For instance, the content presentation device 200 may sit as a node on a local area network (LAN) at customer premises, with the content presentation device having an assigned Internet Protocol (IP) address on the LAN and the LAN having an IP address on the network 206. The content presentation device 200 could thus engage in data communication with various entities via the network 206 while the content presentation device 200 is receiving and rendering the channel of content 202 provided by the content distribution system 204.

Shown accessible via the network 206 (e.g., at a defined IP address on the network) is a fingerprint-matching server 208, which as noted above could operate to engage in fingerprint-based ACR processing. With this network arrangement, the content presentation device 200 could engage in IP communication with the fingerprint-matching server 206 via network 206, providing the fingerprint-matching server 208 with query fingerprints representing the media content of the channel 202 that the content presentation device 200 is rendering. And the fingerprint-matching server could compare those query fingerprints with reference fingerprints of various known channels, in an effort to determine the channel 202 that the content presentation device 200 is rendering.

As discussed above, the fingerprint-matching server 208 could be provisioned with reference data 210 that includes reference fingerprints respectively representing each of various channels accessible to the content presentation device 200. As noted above, for instance, content distribution system 204 could generate and provide this reference data to fingerprint-matching server on an ongoing basis for each of various such channels. For instance, as to each channel of media content that the content distribution system outputs, the content distribution system could generate timestamped digital reference fingerprints of frames of the media content on a per frame basis or other ongoing basis, using any digital fingerprinting process now known or later developed, and could provide the fingerprint-matching server with the timestamped digital reference fingerprints along with data identifying the associated channel (such as a source identifier (SID) and/or other channel identification).

Without limitation, an example digital fingerprinting process could apply on a per video frame basis and could involve establishing a representation of luminosity and/or other video characteristics. For instance, for a given video frame, a fingerprint generator could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Other digital fingerprinting processes could be used as well.

As the fingerprint-matching server receives this reference data including the generated reference fingerprints along with associated data, the fingerprint-matching server 208 could store the reference data in a relational database or other form suitable for ready searching and access.

The example content presentation device 200 is equipped with a fingerprint generator 212 (e.g., program instructions executable by a processor of the content presentation device 200), which is configured to generate query fingerprints representing the media content of the channel 202 that the content presentation device 200 is currently rendering. The fingerprint generator 212 could be configured to receive as input a copy of the media content of the channel as the media content arrives at the content presentation device 200 and/or is processed for presentation by the content presentation device 200, and the fingerprint generator 212 could be configured to generate the query fingerprints of the media content on a per frame basis or other ongoing basis, using the same digital fingerprinting process used to generate the reference fingerprints, so as to facilitate a comparison of the query fingerprints with the reference fingerprints.

Further, the content presentation device 200 could be configured to transmit its generated query fingerprints via network 206 to the fingerprint-matching server 208 for analysis, to facilitate fingerprint-based ACR and associated channel-specific action. By way of example, the content presentation device 200 could be configured to periodically or otherwise from time to time transmit to the server the query fingerprints representing a latest series of frames of the channel being rendered by the content presentation device 200. For instance, the content presentation device 200 could generate a message carrying the latest generated query fingerprints, along with one or more timestamps and/or other associated data, and could transmit the message to the IP address of the fingerprint-matching server 208 for analysis.

As noted above, given the query fingerprints representing media content of the channel 202 being rendered by the content presentation device 200, and given the reference data including reference fingerprints respectively representing each of various known channels, the fingerprint-matching server 208 could engage in fingerprint-based ACR processing. In particular, as noted, the fingerprint-matching server could compare the query fingerprints with the reference fingerprints in an effort to find a match.

To compare a given query fingerprint with a given reference fingerprint, the fingerprint-matching server 208 could compare corresponding portions of the fingerprints with each other to determine whether the portions match exactly or within defined tolerances. For example, the fingerprint-matching server 208 could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Numerous other examples are possible as well.

Upon finding with sufficient certainty that the query fingerprints match the reference fingerprints of a particular channel, the fingerprint-matching server 208 could then conclude that that is the channel being rendered by the content presentation device 200.

And as further noted above, based on this identification of the channel being rendered by the content presentation device, the fingerprint-matching server 208 could then take or cause to be taken one or more useful channel-specific actions.

For present purposes, for instance, the fingerprint-matching server 208 could then responsively engage in processing to detect a modifiable-content segment, such as a replaceable ad, in the channel that the content presentation device is receiving and to responsively prepare and cause the content presentation device to engage in content modification (e.g., DAI) with respect to that modifiable-content segment.

As noted above, for instance, a content management system 216 may have provisioned the fingerprint-matching server 208 in advance with modifiable-content segment data 218, including fingerprints of each of various modifiable-content segments (e.g., replaceable ads) and with associated metadata, including an identifier of each modifiable-content segment for instance. Thus, having identified the channel being rendered by the content presentation device 200, the fingerprint-matching server 208 could then responsively start comparing the reference fingerprints of that identified channel with the fingerprints of the various modifiable-content segments in an effort to find a match. And upon finding with sufficient certainty that the identified-channel reference fingerprints match the fingerprints of a specific modifiable-content segment, the fingerprint-matching server 208 could then engage in signaling to enable and prepare the content presentation device 200 to carry out a content modification with respect to that modifiable-content segment.

For instance, the fingerprint-matching server could provide the content presentation device 200 with various data as noted above regarding the upcoming modifiable content opportunity, including timing information and other content-modification information for example, to enable the content presentation device 200 to obtain supplemental content. And the fingerprint-matching server 208 could provide the content presentation device 200 with certain reference fingerprints of the identified channel for use to help confirm that the content presentation device 200 continues to receive the identified channel, as a condition for starting or continuing with the content modification.

The content presentation device 200 could then engage in signaling via network 206 with the content management system 216 and perhaps with a supplemental-content delivery system 220, as discussed above, to ascertain and obtain supplemental content (e.g., a replacement ad). And the content presentation device could carry out the content modification with respect to the modifiable-content segment.

FIG. 2 additionally illustrates an example metering device 222 that is in communication with the content presentation device 200 and with network 206. As noted above, metering devices such as this could be provided in select households or other places where content presentation devices may operate, for purposes of tracking media consumption, such as to track playout of ads for instance.

The metering device 222 could be connected with content presentation device 200, perhaps as an adjunct device connected within a media input line through which the content presentation device 200 receives media content of the channel 202 that it is rendering, so that the metering device could track the media being received and rendered by the content presentation device 200. Alternatively, the metering device 222 could be situated within media-output range of the content presentation device so that it can monitor media content as that content is presented by the content presentation device 200.

To facilitate ad-playout monitoring, as noted above, the media content of a channel could be watermarked with an ad-identity respectively of each of various ads present on the channel.

As is known in the art, watermarking involves permanently embedding or otherwise encoding information into media content in a manner that enables the information to be decoded and extracted from the media content by a receiver of the media content but that may be imperceptible to a user to whom the media content is presented. This is in contrast to inserting such information into a packet header or the like without encoding the information into the underlying media content itself. Watermarking permanently changes the media content and may be impossible to remove.

More particularly, watermarking media content could involve encoding into the media content a code that can be mapped to associated information, or perhaps more directly encoding into the media content the associated information. In an example implementation, the watermark code could be on the order of 24 bits, and the watermarking could be done in an audio component of the media content and/or in a video component of the media content, depending on the form of the media content for instance.

Existing audio watermarking techniques include, without limitation, inserting audio energy into the audio signal or otherwise adjusting one or more characteristics of the audio signal in a manner that can be detected by a suitably configured watermark-detection algorithm but that is masked from hearing (e.g., the audio characteristic and/or manner of encoding being sufficient to hide the watermark from human detection)—known as stenographic or psychoacoustic encoding.

Examples of audio watermarks and corresponding watermark detection techniques are described in U.S. Pat. No. 8,359,205 (entitled "Methods and Apparatus to Perform Audio Watermarking and Watermark Detection and Extraction," which issued on Jan. 22, 2013), U.S. Pat. No. 8,369,972 (entitled "Methods and Apparatus to Perform Audio Watermarking Detection and Extraction," which issued on Feb. 5, 2013), U.S. Patent Application Pub. No. 2010/0223062 (entitled "Methods and Apparatus to Perform Audio Watermarking and Watermark Detection and Extraction," which was published on Sep. 2, 2010), U.S. Pat. No. 6,871,180 (entitled "Decoding of Information in Audio Signals," which issued on Mar. 22, 2005), U.S. Pat. No. 5,764,763 (entitled "Apparatus and Methods for Including Codes in Audio Signals and Decoding," which issued on Jun. 9, 1998), U.S. Pat. No. 5,574,962 (entitled "Method and Apparatus for Automatically Identifying a Program Including a Sound Signal," which issued on Nov. 12, 1996), U.S. Pat. No. 5,581,800 (entitled "Method and Apparatus for Automatically Identifying a Program Including a Sound Signal," which issued on Dec. 3, 1996), U.S. Pat. No. 5,787,334 (entitled "Method and Apparatus for Automatically Identifying a Program Including a Sound Signal," which issued on Jul. 28, 1998), and U.S. Pat. No. 5,450,490 (entitled "Apparatus and Methods for Including Codes in Audio Signals and Decoding," which issued on Sep. 12, 1995, all of which are hereby incorporated by reference in their entireties.

Existing video watermarking techniques, on the other hand, involve embedding a code in a video component of the media content in a manner that can be detected by a suitably configured watermark-detection algorithm but that is masked from human visual detection.

Examples of video watermarking techniques include various spatial-domain techniques such as flipping pixels, embedding the watermark into least significant bits, and adding a pseudo-random noise pattern to the video, and various frequency-domain techniques, such as SVD domain watermarking, Discrete Fourier Transform watermarking, Discrete Cosine Transform watermarking, Discrete Wavelet Transform watermarking, and principal component analysis watermarking. Other examples are possible as well.

An example system to facilitate monitoring of ad-playout could make use of audio watermarking. For instance, for the duration of each ad on the channel, the media content of the channel (i.e., the media content of the ad) could be periodically watermarked with an ad-identifier and media timestamp information. And the metering device 222 could be configured with a watermark decoder (not shown) to regularly detect and decode such watermarks, to read the ad-identities and timestamps, and to report the ad-identity and timestamp information via network 206 to the data management system 214.

As noted above, the present disclosure provides for making use of this or other such channel watermarking for purposes of controlling content modification, such as DAI. In an example implementation, as noted above, the fingerprint-matching server 208 could determine through a fingerprint comparison that a portion of the media content on the channel being rendered by the content presentation device matches at least one modifiable-content segment. And the fingerprint-matching server 208 could respond to that determination by engaging in a process to determine from watermark data encoded on the channel the actual identity of the modifiable-content segment at that portion of the media content on the channel.

As noted above, for instance, the fingerprint-matching server 208 could responsively signal to the content distribution system 204 to request that the content distribution system 204 extract from the media content of the channel the watermark-encoded identifier of the modifiable-content segment actually present on the channel. Here, for instance, the fingerprint-matching server 208 could specify the channel identity and relevant timing information to enable the content distribution system 204 to engage in appropriate watermark decoding and to respond accordingly. The fingerprint-matching server 208 could thus receive in response from the content distribution system 204 the modifiable-content segment identity determined from watermark data on the channel. And the fingerprint-matching server 208 could then use that determined modifiable-content segment identity as a basis to control the content-modification process.

As further noted above, in one implementation, if the fingerprint-matching server 208 had already signaled to the content presentation device to cause the content presentation device to start preparations for the content modification, then the fingerprint-matching server 208 could now use the modifiable-content segment identity determined from the watermark as a basis to control whether the content presentation device should continue preparing for the content modification.

Namely, as noted above, if the fingerprint-matching server 208 determines that the actual modifiable-content segment identity is the same as the modifiable-content segment identified by the fingerprint-matching server 208, then, based at least in part on that determination, the fingerprint-matching server 208 could allow the process to continue. Whereas, if the fingerprint-matching server 208 determines that the actual modifiable-content segment identity is different than the modifiable-content segment identified by the fingerprint-matching server 208, then, based at least in part on that determination, the fingerprint-matching server 208 could engage in further signaling with the content presentation device to cause the content presentation device 200 to abandon preparations for the content modification and thus to not engage in the content modification.

And as noted above, in another implementation, if the fingerprint-matching server 208 had identified through the fingerprint comparison process at least two modifiable-content segments that each match the portion of the media content on the channel being rendered by the content presentation device 200, then the fingerprint-matching server 208 could use the modifiable-content segment determined from the watermark as a basis to disambiguate that multi-match, establishing that the modifiable-content segment determined from the watermark is the modifiable-content segment present on the channel. Therefore, the fingerprint-matching server 208 could then proceed to engage in signaling with the content presentation device 200 to prepare and enable the content presentation device 200 to carry out a content modification with respect to that modifiable-content segment.

Figure 3:
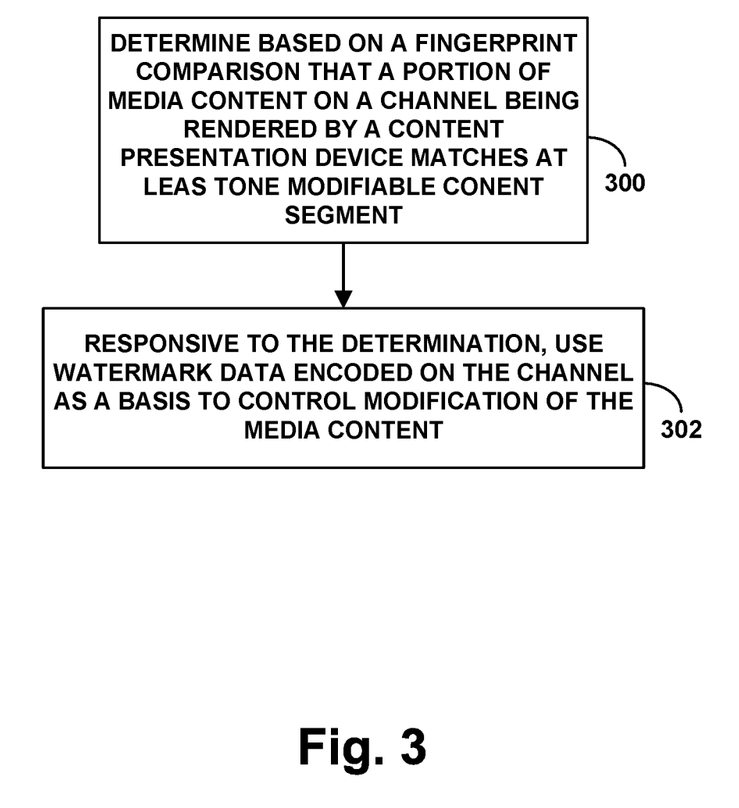
FIG. 3 is a flow chart depicting a method that could be carried out in accordance with the disclosure.

FIG. 3 is next a flow chart depicting a method that can be carried out in accordance with the present disclosure. As shown in FIG. 3, at block 300, the method includes determining based on a fingerprint comparison that a portion of media content on a channel being rendered by a content presentation device matches at least one modifiable-content segment. And at block 302, the method includes, responsive to the determining, using watermark data encoded on the channel as a basis to control modification of the media content.

In line with the discussion above, each modifiable-content segment could be a replaceable ad. Further, using the watermark data encoded on the channel as a basis to control the modification of the media content could involve using the watermark data encoded on the channel as a basis to control whether to allow the modification to occur.

As further discussed above, the act of determining based on the fingerprint comparison that the portion of media content on the channel being rendered by a content presentation device matches at least one modifiable-content segment could involve determining based on the fingerprint comparison that the portion of the media content matches a particular modifiable-content segment. And the act of using the watermark data encoded on the channel as a basis to control modification of the media content could involve (i) ascertaining from the watermark data an actual identity of a modifiable-content segment present on the channel and making a determination of whether the actually identified modifiable-content segment is the particular modifiable-content segment, (ii) if the determination is affirmative, then, based at least in part on the determination, allowing the modification of the media content to proceed, and (iii) if the determination is negative, then, based at least in part on the determination, causing abandonment of the modification of the media content.

Alternatively, the act of determining based on the fingerprint comparison that the portion of media content on the channel being rendered by a content presentation device matches at least one modifiable-content segment could involve determining based on the fingerprint comparison that the portion of the media content matches multiple modifiable-content segments rather than just a single modifiable-content segment. And the act of using the watermark data encoded on the channel as a basis to control modification of the media content could involve (i) ascertaining from the watermark data an actual identity of a modifiable-content segment present on the channel and (ii) using the ascertained actual identity as a basis to disambiguate so as to determine which of the multiple modifiable-content segments is the modifiable-content segment present on the channel.

In line with the discussion above, this method could be carried out by at least a server that is in is in network communication with the content presentation device (e.g., that has an interface through which to engage in such communication). And in that case, the act of using the watermark data encoded on the channel as a basis to control modification of the media content could be carried out after the server has directed the content presentation device to carry out the modification. For instance, the server could first transmit to the content presentation device a directive to cause the content presentation device to carry out the modification, and the server could then use the watermark data encoded on the channel as a basis to control modification of the media content, such as to cause abandonment or other change to the modification process.

Figure 4:
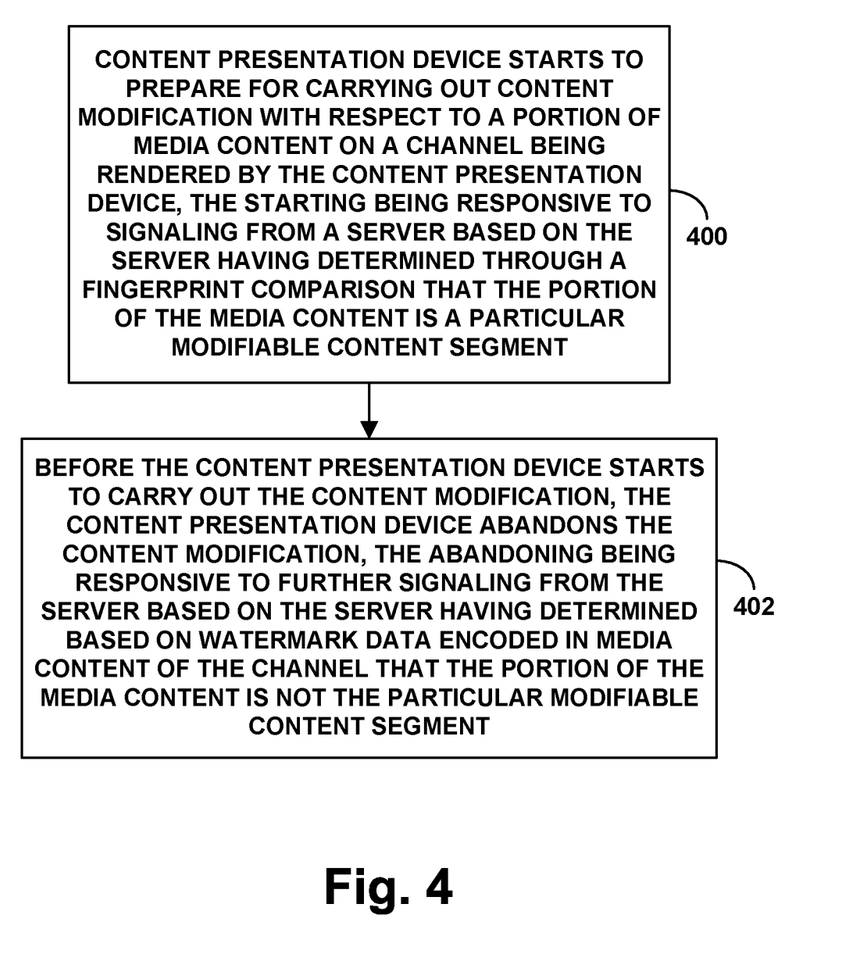
FIG. 4 is another flow chart depicting a method that could be carried out in accordance with the disclosure.

Further, in this method, the fingerprint comparison could be video based and the watermark data could be audio based, among various other possibilities FIG. 4 is next a flow chart depicting another method that can be carried out in accordance with the present disclosure. As shown in FIG. 4, at block 400, the method includes a content presentation device starting to prepare for carrying out content modification with respect to a portion of media content on a channel being rendered by the content presentation device, the starting being responsive to signaling from a server based on the server having determined through a fingerprint comparison that the portion of the media content is a particular modifiable-content segment. And at block 402, the method includes, before the content presentation device starts to carry out the content modification, the content presentation device abandoning the content modification, the abandoning being responsive to further signaling from the server based on the server having determined based on watermark data encoded in media content of the channel that the portion of the media content is not the particular modifiable-content segment.

The act of the content presentation device starting to prepare for carrying out the content modification could include the content presentation device engaging in one or more operations specifically related to preparing for the content presentation device to carry out the content modification. Without limitation, examples of such operations could include (i) the content presentation device receiving from the fingerprint-matching server or other system a directive (e.g., instruction or other trigger) for the content presentation device specifically to carry out the content modification, (ii) the content presentation device querying local or remote storage to obtain modified content specifically for the content presentation device to present in place of the particular modifiable-content segment, and/or (iii) the content presentation device setting a time or other logical trigger for the content presentation device to begin playout of the modified content in place of the particular modifiable-content segment. Other example operations could possible as well.

Further, the content modification could involve presentation of modified content in place of the particular modifiable-content segment. Thus, the act of abandoning the content modification before the content presentation device starts to carry out the content modification could involve discontinuing the plan to present the modified content in place of the particular modifiable-content segment before the content presentation device begins presenting the modified content in place of the particular modifiable-content segment.

Various features described above could be applied in this context as well. For instance, the particular modifiable-content segment could be a replaceable ad. And the fingerprint comparison could be video based and the watermark data could be audio based.

Figure 5:
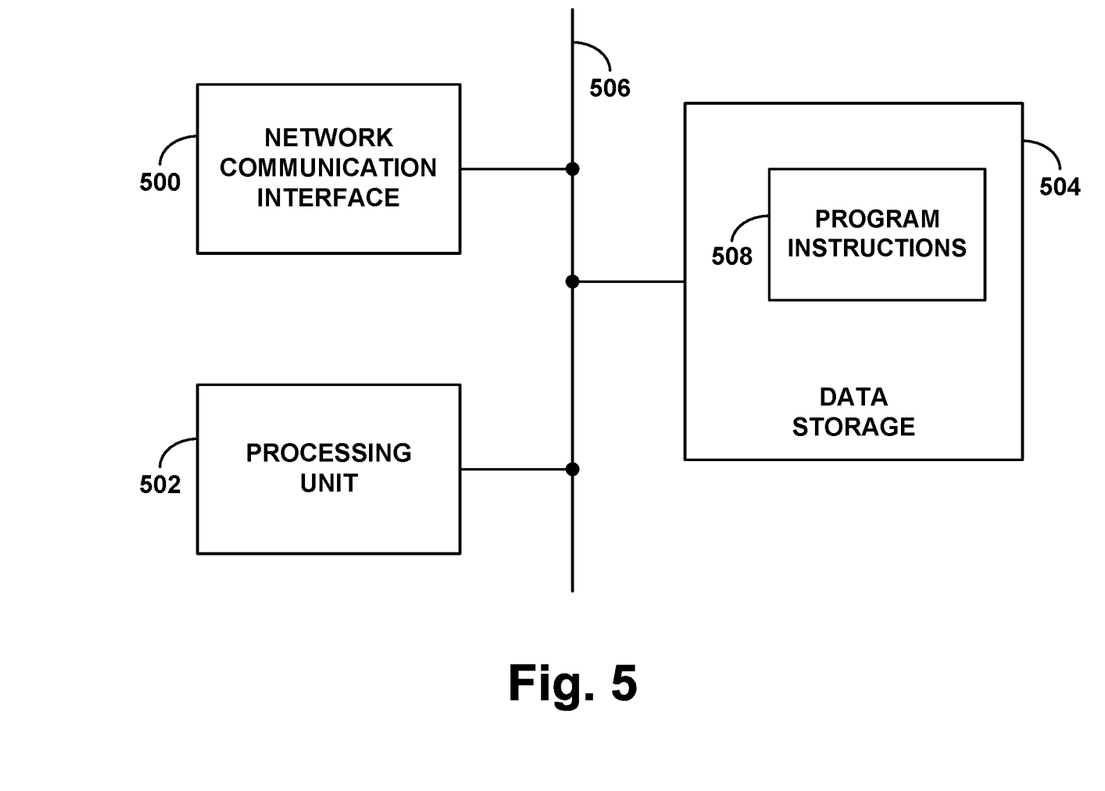
FIG. 5 is a simplified block diagram of an example system that could operate in accordance with the disclosure.

FIG. 5 is next a simplified block diagram of an example system operable in accordance with the present disclosure. This system could represent a fingerprint-matching server as described above, and/or one or more other entities (possibly including the content presentation device). As shown in FIG.

5, the example system includes a network communication interface 500, a processing unit 502, non-transitory data storage 504, any or all of which could be integrated together or, as shown, communicatively linked together by a system bus, network, or other connection mechanism 506.

Network communication interface 500 could comprise one or more physical network connection mechanisms to facilitate communication on a network such as network 206 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 502, could comprise one or more general purpose processors (e.g., microprocessors) and/or one or more specialized processors (e.g., application specific integrated circuits). And non-transitory data storage 506 could comprise one or more volatile and/or non-volatile storage components, such as optical, magnetic, or flash storage for instance.

As shown, the data storage 504 of the example system stores program instructions 608, which could be executable by processing unit 502 to carry out (e.g., to cause the system to carry out) various operations described herein, such as (i) determining based on a fingerprint comparison that a portion of media content on a channel being rendered by a content presentation device matches at least one modifiable-content segment, and (ii) responsive to at least the determining, using watermark data encoded on the channel as a basis to control modification of the media content.

Various features described above could be applied in this context as well. For instance, the system could be separate from the content presentation device, in which case the operation of using the watermark data encoded on the channel as a basis to control modification of the media content is carried out after the system has directed the content presentation device to carry out the modification.

Figure 6:
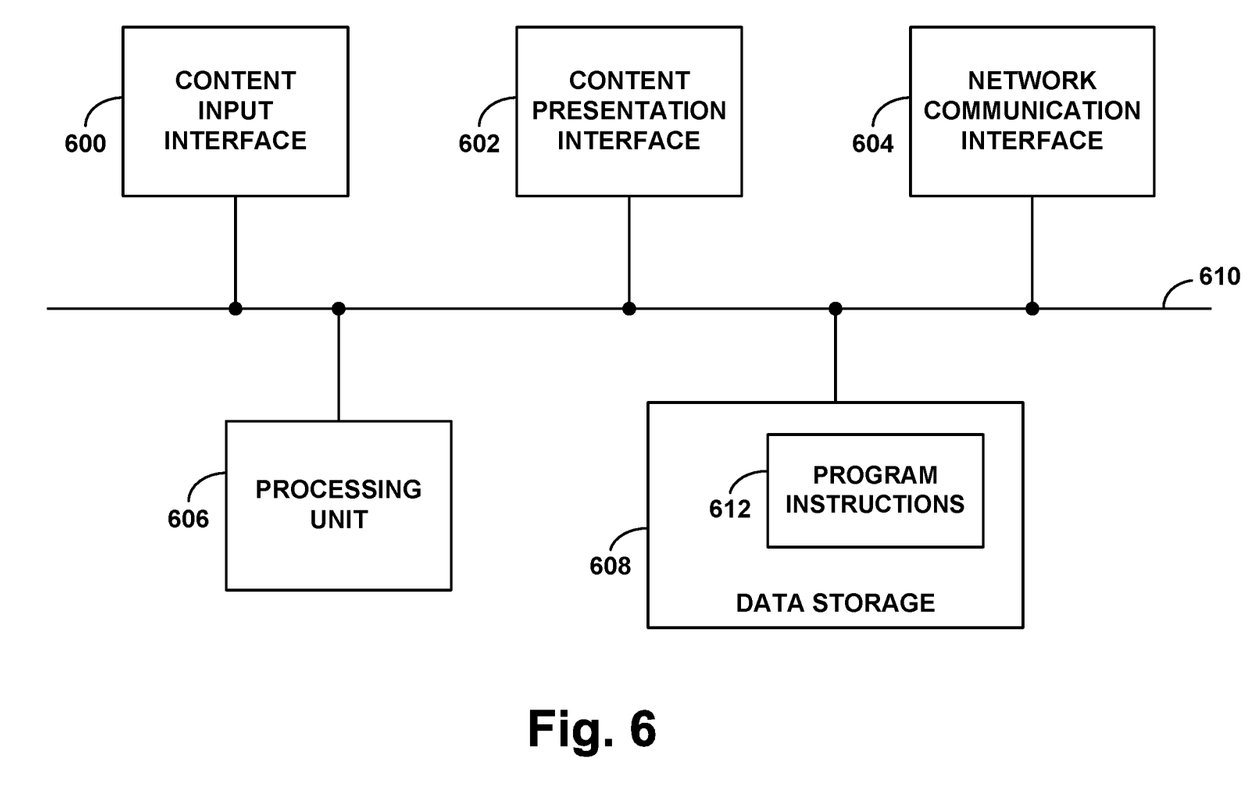
FIG. 6 is a simplified block diagram of an example content presentation device that could operate in accordance with the disclosure.

Finally, FIG. 6 is a simplified block diagram of an example content presentation device operable in accordance with the present disclosure. In line with the discussion above, this content presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 6, the example content presentation device includes a content input interface 600, a content presentation interface 602, a network communication interface 604, a processing unit 606, and non-transitory data storage 608, any or all of which could be integrated together or, as shown, communicatively linked together by a system bus, network, or other connection mechanism 610.

Content input interface 600 could comprise a physical communication interface for receiving media content to be presented by the content presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others, and/or a tuner and/or receiver for receiving content more directly from a content distributor or the like.

Content presentation interface 602 could then comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 604 could comprise a physical network connection mechanism to facilitate communication on a network such as network 206 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 606 could then comprise one or more general purpose processors (e.g., microprocessors) and/or one or more specialized processors (e.g., application specific integrated circuits). And non-transitory data storage 608 could comprise one or more volatile and/or non-volatile storage components, such as optical, magnetic, or flash storage. Further, as shown, data storage 608 stores program instructions 612, which could be executable by processing unit 606 to carry out (e.g., to cause the content presentation device to carry out) various operations described herein.

Various features described above could be applied in this context as well.

Further, the present disclosure also contemplates at least one non-transitory computer readable medium encoded with or otherwise embodying program instructions executable by at least one processing unit to carry out various operations as described herein.

Exemplary embodiments have been described above. Those skilled in the art will understand, however, that changes and modifications may be made to these embodiments without departing from the true scope and spirit of the invention.

What is claimed is:

1. A method comprising:
  determining based on a fingerprint comparison that a portion of media content on a channel being rendered by a content presentation device matches multiple modifiable-content segments, wherein the multiple modifiable-content segments are different than each other;
  responsive to the determining that the portion of media content on the channel being rendered by the content presentation device matches the multiple modifiable-content segments, using watermark data encoded on the channel as a basis to determine which of the multiple modifiable-content segments is present on the channel; and
  using the watermark data encoded on the channel as a basis to control whether to allow modification of the media content to occur,
  wherein the method is carried out by at least a server that is in network communication with the content presentation device, and wherein using the watermark data encoded on the channel as a basis to control whether to allow the modification to occur is carried out after the server has directed the content presentation device to carry out the modification.

2. The method of claim 1, wherein each of the modifiable-content segments is a replaceable ad.

3. The method of claim 1, wherein the fingerprint comparison is video based and the watermark data is audio based.

4. The method of claim 1, wherein the multiple modifiable-content segments that are different than each begin with the same media content as each other, and wherein determining that the portion of the media content matches the multiple modifiable-content segments is a result of the multiple modifiable-content segments beginning with the same media content as each other.

5. A system comprising:
a network communication interface;
a processing unit;
non-transitory data storage; and
program instructions stored in the non-transitory data storage and executable by the processing unit to carry out operations including:
determining based on a fingerprint comparison that a portion of media content on a channel being rendered by a content presentation device matches multiple modifiable-content segments,
responsive to the determining that the portion of media content on the channel being rendered by the content presentation device matches the multiple modifiable-content segments, using watermark data encoded on the channel as a basis to determine which of the multiple modifiable-content segments is present on the channel, and
using the watermark data encoded on the channel as a basis to control whether to allow modification of the media content to occur,
wherein the system is separate from the content presentation device, and wherein using the watermark data encoded on the channel as a basis to control whether to allow the modification to occur is carried out after the system has directed the content presentation device to carry out the modification.

6. The system of claim 5, wherein each of the modifiable-content segments is a replaceable ad.

7. The system of claim 5, wherein the fingerprint comparison is video based and the watermark data is audio based.

8. The system of claim 5, wherein the multiple modifiable-content segments that are different than each other begin with the same media content as each other, and wherein determining that the portion of the media content matches the multiple modifiable-content segments is a result of the multiple modifiable-content segments beginning with the same media content as each other.

9. At least one non-transitory computer-readable medium embodying program instructions executable by at least one processing unit to carry out operations including:
determining based on a fingerprint comparison that a portion of media content on a channel being rendered by a content presentation device matches multiple modifiable-content segments, wherein the multiple modifiable-content segments are different than each other,
responsive to the determining that the portion of media content on the channel being rendered by the content presentation device matches the multiple modifiable-content segments, using watermark data encoded on the channel as a basis to determine which of the multiple modifiable-content segments is present on the channel, and
using the watermark data encoded on the channel as a basis to control whether to allow modification of the media content to occur,
wherein using the watermark data encoded on the channel as a basis to control whether to allow the modification to occur is carried out after directing the content presentation device to carry out the modification.

10. The at least one non-transitory computer-readable medium of claim 9, wherein each of the modifiable-content segments is a replaceable ad.

11. The at least one non-transitory computer-readable medium of claim 9, wherein the multiple modifiable-content segments that are different than each other begin with the same media content as each other, and wherein determining that the portion of the media content matches the multiple modifiable-content segments is a result of the multiple modifiable-content segments beginning with the same media content as each other.

12. The at least one non-transitory computer-readable medium of claim 9, wherein the fingerprint comparison is video based and the watermark data is audio based.

* * * * *